US006208324B1

(12) United States Patent
Sundstrom et al.

(10) Patent No.: US 6,208,324 B1
(45) Date of Patent: Mar. 27, 2001

(54) EVENT/SWITCH MATRIX WINDOW

(75) Inventors: Gunilla A. Sundstrom, Beverly, MA (US); Anthony C. Salvador, Beaverton, OR (US); Thomas F. Mertzig, Manchester, NH (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 08/138,649

(22) Filed: Oct. 18, 1993

(51) Int. Cl.[7] .................................................. G09G 5/00
(52) U.S. Cl. .............................................. 345/115; 345/117
(58) Field of Search ..................................... 345/115, 117, 345/116, 146, 118, 344; 348/722; 379/1, 9, 32, 33, 34; 395/161; 340/825.17

(56) References Cited

U.S. PATENT DOCUMENTS 5,049,873 * 9/1991 Robins et al. ........................ 379/32
5,200,744 * 4/1993 Hiromoto et al. .................... 345/115
5,319,363 * 6/1994 Welch et al. ..................... 340/825.17

FOREIGN PATENT DOCUMENTS

0529770 * 3/1993 (EP) .

* cited by examiner

Primary Examiner—Dennis-Doon Chow
(74) Attorney, Agent, or Firm—Leonard Charles Suchyta

(57) ABSTRACT

An Event/Switch Matrix Window is disclosed allowing the graphical presentation of operational information pertinent to network operators responsible for monitoring and controlling the workings of a telecommunications environment such as the public telephone network. Further, the Event/Switch Matrix Window allows the network operator the ability to custom tailor the presentation of information dynamically to respond to the immediate needs of the network operator in monitoring the telecommunications network.

1 Claim, 3 Drawing Sheets

EVENT/SWITCH MATRIX WINDOW

FIELD OF THE INVENTION

The disclosed invention relates generally to a computer system having a windowing environment for control and monitoring of operational tasks, and more particularly to a computer system for control and monitoring of operational tasks in a telecommunications environment wherein an operator may configure the presentation of diverse information according to his needs.

BACKGROUND OF THE INVENTION

The current public switched telephone network employs thousands of switches, multiplexors, and other telecommunications devices that must work in concert in order to provide for the connection and completion of the ordinary telephone call. Many of these devices provide for status information which is sent back over the network to control centers regarding the health of the network. Different methods have been utilized in the past to present information from telecommunications network equipment to a network operator who is responsible for monitoring and controlling the operation of that equipment. The most common of these methods used computers that provide information to the network operator in a simple text-based presentation of the equipment activity as provided by the equipment manufacturer. The presentations are typically chronological reports of equipment activity which may not be relevant to the network operators needs. Moreover, a network operator is unable to tailor the presentation to address new needs corresponding to a changed operational environment.

In another approach, telecommunication network maintenance and monitoring is addressed with the use of a computer support system, typically using computer displays called "awareness screens" or alarm monitors." The computer support system extracts information available from the telecommunications equipment and delivers it to a network operator on a computer display. However, these displays are inflexible, in that a network operator cannot tailor the display for the assessment of the current problem.

Prior attempts to provide overview or summary information for monitoring the telecommunications environment have included geographic mapping in which telecommunications devices are displayed according to their relative physical location on a map. However, geographic maps typically require more space on a computer display. Thus these maps are cluttered and provide for less information.

What is desirable is single, common presentation of an overview of all pertinent information, which can be tailored by the network operator, for dynamically controlling a telecommunications operating environment.

OBJECTS OF THE INVENTION

Accordingly, it is a primary of this invention to obviate the above noted and other disadvantages of the prior art.

It is a further object of the invention to provide a novel means of displaying operational network information in a highly ergonomic fashion.

It is a further object of the invention to provide for a means to selectively tailor information according to the needs of a network operator for presentation on a computer display.

It is a still further object of the invention to provide for a means of selecting and grouping pertinent information for presentation on a computer display.

SUMMARY OF THE INVENTION

In one aspect of the invention, the Event/Matrix Window provides network operators the ability to specifically identify and display overview or summary information necessary for operations control of the telecommunications environment. The Event/Switch Matrix Window allows the network operator to modify the content of the Event/Switch Matrix Window, allowing a window displaying custom information. More specifically, the Event/Switch Matrix Window allows the user to present and rank information such as alarms, messages, and operational diagnostics in the Event/Switch Matrix Window in order to suit the needs of the network operator in carrying out the monitoring and control function.

In another aspect of the invention, the Event/Switch Matrix Window addresses ergonomic difficulties that network operators experience when monitoring telecommunications equipment by using graphical methods to depict pertinent information in the telecommunications environment. Information, including alarms, message and diagnostic information, is presented with the ability to add or delete specific types of information from the Event/Switch Matrix Window, and organize the presentation of the information within the body of the Event/Switch Matrix Window. Moreover, a network operator can directly take action on specific events by directly manipulating the representation of a network device, an icon, in the Event/Switch Matrix Window.

DETAILED DESCRIPTION OF THE PREFERRED EMBODIMENT

The present invention is embodied as a computer program running on a conventional computer system. This computer system includes a processing unit, internal memory for storing instructions to be executed by the processing unit, external memory for storing the computer program of the invention and informational data, and a computer display for presenting the computer screens of the instant invention. The computer system further comprises a telecommunications capability for communicating with external telecommunications devices such as telephone switches, multiplexes, and the like. As will become apparent in the following description, information from these telecommunications devices is processed by the computer program of the instant invention in order to present information for monitoring and controlling these devices.

One of ordinary skill in the art will readily understand how to create the computer program of the invention from the description herein.

Figure 1:
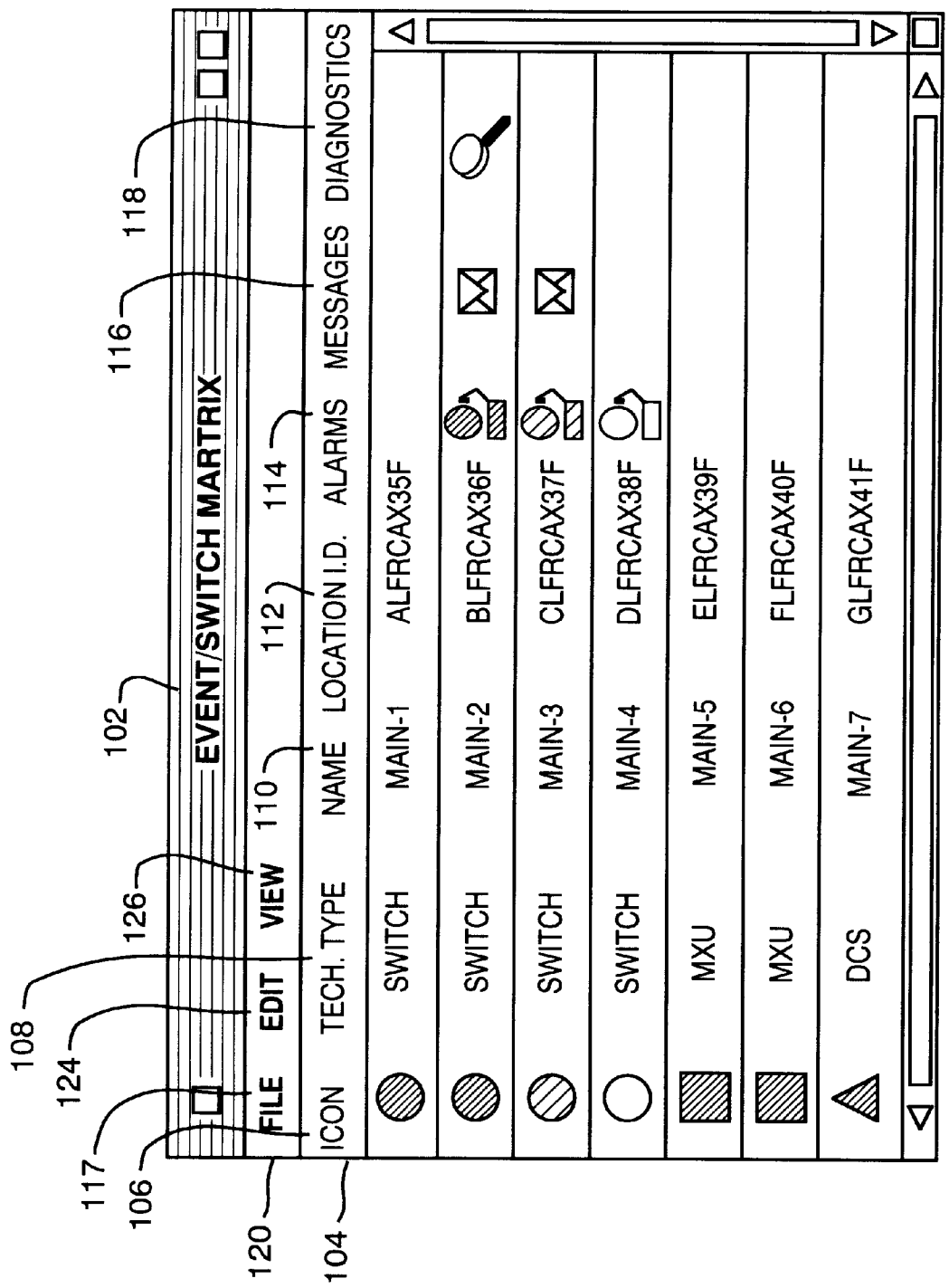
FIG. 1 is an exemplary depiction of the Event/Switch Matrix Window.

The Event/Switch Matrix Window is shown in FIG. 1. A description of each feature of the Event/Switch Matrix Window follows.

The title bar 102 of the Event/Switch Matrix indicates that this window is the Event/Switch Matrix Window while the header bar 104 of the Event/Switch Matrix Window indicates the current content of the Event/Switch Matrix Window itself. Each component of the header bar, labeled 106 through 118, represents a separate type of information included in the window. All information columns except the icon information column 106 may appear or not depending upon the configuration set up by the network operator. In addition, the information columns may appear in any order from left to right, except that the icon information column 106 always appears at the extreme left side of the Event/Switch window. The content of each of the information columns 106 through 118 is described below.

The icon information column 106 shows a pictorial representation of the telecommunications equipment type, network device, for which the other information columns provide further detail. The shape of the icon represents the type of network device monitored and the color represents the most severe alarm condition currently active in that network device.

For example as shown in FIG. 1, circles represent telecommunications switches. Although the shapes representing network device may be assigned by the user, the colors represent the status of the network device. Green is used typically to represent a normal network device status. Red is commonly used to represent a critical alarm status and orange is used to represent major alarm status. A minor alarm status is represented by yellow. A square in this example represents a type of network device called a multiplexor (MXU) and a triangle represents a type of network device called a digital cross connect (DCS). The shapes selected for this example are arbitrary and are shown for illustrative purposes only.

Figure 2:
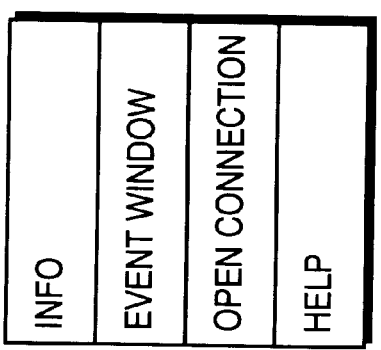
FIG. 2 is a depiction of a pop up menu providing the capability to retrieve information on a specific network device.
Figure 4:
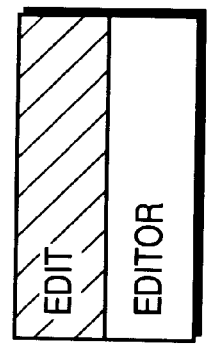
FIG. 4 is a depiction of the edit pop up menu allowing the network operator to edit the contents of the Event/Switch Matrix Window.

Each icon in the Event/Switch Matrix Window is associated with a pop-up menu as shown in FIG. 2. There are four functions available on this pop-up-menu. Network operators using the Info option are provided with information describing a specific network device. Using the second capability, Event Window, a network operator can open an Event Window which presents all of the currently active events, operational occurrences in the network, listed for the specific device of network network device. Further, Open Connection, the third capability, allows a direct, dial up connection to the network device that is reporting the event. If the network device does not accept direct connections, this option is not presented. The fourth capability, Help, allows network operators to access on-line help information for that the indicated type of network network device.

To access a pop-up menu associated with a network device icon, the network operator uses a pointing device, for example a mouse. The network operator may also use the pointing device to access a pop-up menu associated with several network device icons simultaneously. If several icons are selected and if a menu option is not available for one type of network device, then that menu option does not appear. For example, if several icons are selected and one icon represents a network device that does not allow a direct connection, then the connect option will not appear in the pop-up menu associated with those selections. Pop-up Menus are only used to access information or to take some action directly on one or more pieces of information contained in the body of the Event/Switch Matrix Window.

The technology type information column 108 specifies the generic type of network network device for the device. Examples are switch, multiplexor, modem or the like. New device types can be added to satisfy future network device utilized in monitoring the telecommunications network.

The name information column 110 provides the commonly used name for the specific piece of network device represented in the row.

The location I.D. information column 112 specifies a network unique identification including physical location of the network device represented. This information column may specify the location with a Common Language Location Identifier code, CLLI code, if available for the device.

The alarm information column 114 depicts graphically active alarms for the network device. Since a network device may have multiple alarms outstanding only the alarm having the highest severity level is displayed. Again colors are used to indicate the severity level of the alarm. with yellow, orange and red representing minor, major and critical alarms respectfully.

The message information column 116 depicts graphically that a message in text format is available from the indicated network device.

The diagnostics information column 118 indicates graphically that a diagnostic routine, providing operational status, is currently running for the indicated device.

Figure 3:
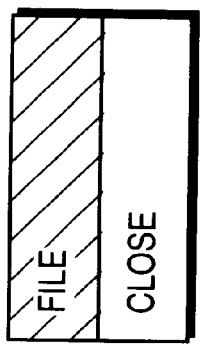
FIG. 3 is a depiction of the file pop up menu allowing the network operator to close the Event/Switch Matrix Window.
Figure 5:
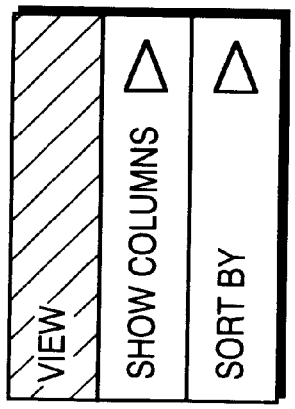
FIG. 5 is a depiction of the view pop up menu allowing the network operator to view or sort events according to specified criteria.
Figure 6:
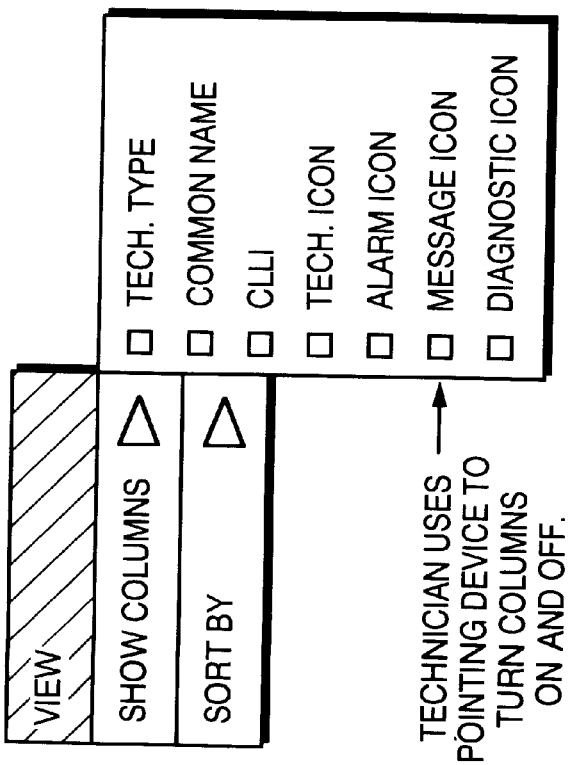
FIG. 6 is a depiction of a cascading view pop up menu for the Show Column option.

The menu bar 120 of the Event/Switch Matrix Window presents three menu options, File, Edit and View. The file menu option 122, as shown in FIG. 3, allows the network operator to close the entire window. The edit menu option 124, as shown in FIG. 5, provides the capability for the network operator to open the Event/Switch Matrix Window Editor, which allows the network operator to edit the configuration and presentation content of the Event/Switch Matrix Window. The view menu option provides two separate capabilities. First, as depicted in FIG. 5, view menu allows network operators to Show Columns, allowing the network operator to decide which of the information columns identified as 106 through 118 are to be displayed in the Event/Switch Matrix Window. Having selected the view menu, a second, cascading menu appears to the right of the arrow, as show in FIG. 6. Through the use of a pointing device, the network operator can click on the squares to the left of the information column names. By toggling the buttons, information columns are chosen to appear.

Figure 7:
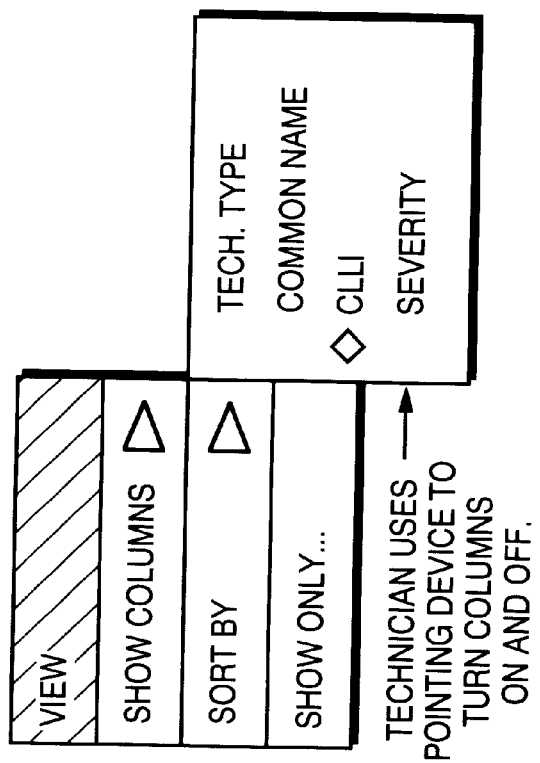
FIG. 7 is a depiction of a cascading view pop up menu for the Sort By View option.

A second view menu option is Sort By. Selecting this option, a second, cascading menu appears. Sort By allows the network operator to organize the monitored network device in the Event/Switch Matrix Window according to one of four characteristics. The network operator uses the pointing device as with the Show Columns option. However, the Event/Switch Matrix Window can only be sorted according to one characteristic at a time, so only one diamond shape appears in the cascading menu at a time indicating how the monitored network device in the Event/Switch Matrix Window is currently sorted. FIG. 7 shows the cascading menu for the Sort By View Menu option. Network operators can sort the monitored network device alphabetically the type of network device monitored, the technical type information column 108, alphabetically by the common name information column 110 of the network device, alphabetically by the location I.D. information column and in descending order by the most severe alarm currently active for the monitored network device. That is, for the latter, the network device having the most severe active alarms are listed first, followed by network devices with alarms of lesser severity.

If there are more switches or information columns than will fit in the window, a scroll bar appears on the bottom and/or to the right side of the window allowing the network operator to scroll through the window in a conventional manner.

While there has been shown and described what is at present considered the preferred embodiment of the invention it will be obvious to those skilled in the art that various changes and modifications may be made therein without departing from the invention as defined by the appended claims.

What is claimed is:

1. A computer system for monitoring a plurality of telecommunication switches in a telecommunications network comprising:

input means for receiving network events consisting of alarms and messages reporting a failure from a telecommunication switch in the telecommunications network;

display means for graphically presenting, using icons, only the highest existing severity level of said network events for an individual telecommunications switch, and presenting diagnostic routines executing for said telecommunication switch for curing the said failure of the telecommunications switch;

wherein the presentation of the display means is dynamically configurable.

* * * * *